United States Patent [19]

Briggs et al.

[11] Patent Number: 5,138,678
[45] Date of Patent: Aug. 11, 1992

[54] CONNECTOR WITH A VARIABLE DIRECTION STRAIN RELIEF

[76] Inventors: Robert C. Briggs, 342 N. Fourth St., Newport, Pa. 17074; Steven P. Owens, R.D. #2, Box 3031A, Grantville, Pa. 17028; Robert N. Weber, 29 S. Railroad St., Hummelstown, Pa. 17036

[21] Appl. No.: 763,108
[22] Filed: Sep. 20, 1991
[51] Int. Cl.⁵ .................................. G02B 6/36
[52] U.S. Cl. ................................ 385/86; 385/87; 174/86; 174/73.1; 174/75 D
[58] Field of Search ................. 385/86, 87, 76; 174/73.1, 75 D, 86

[56] References Cited

U.S. PATENT DOCUMENTS

| | | | |
|---|---|---|---|
| 3,307,137 | 2/1967 | Tordoff et al. | 174/75 D |
| 3,819,849 | 6/1974 | Baker | 174/86 |
| 4,167,303 | 9/1979 | Bowen et al. | 350/96.21 |
| 4,203,004 | 5/1980 | Cox | 174/135 |
| 5,037,175 | 8/1991 | Weber | 385/76 |
| 5,073,044 | 12/1991 | Enger et al. | 385/86 |

FOREIGN PATENT DOCUMENTS

| | | |
|---|---|---|
| 0260774 | 3/1988 | European Pat. Off. . |
| 0374136 | 6/1990 | European Pat. Off. . |
| 2069175 | 8/1981 | United Kingdom . |

*Primary Examiner*—John D. Lee
*Assistant Examiner*—Stephen W. Barns
*Attorney, Agent, or Firm*—Gerald K. Kita

[57] ABSTRACT

A fiber optic connector (1) for an optical fiber cable (2), comprising; a strain relief (3) encircling the cable (2), a housing (4), and a fixture (5) attached to the strain relief (3), the fixture (5) interlocking with the housing (4) at a stationary position angularly pointing the strain relief (3) and the cable (2) relative to the housing (4).

20 Claims, 5 Drawing Sheets

CONNECTOR WITH A VARIABLE DIRECTION STRAIN RELIEF

FIELD OF THE INVENTION

The specification relates to a fiber optic connector with a strain relief for an optical fiber cable.

BACKGROUND OF THE INVENTION

A fiber optic connector disclosed in EP application 90200113.0, publication number 0,374,136, comprises, two mating housing halves that interlock, and the rear ends of the housing halves close over a flexible strain relief that encircles an optical fiber cable. The strain relief can bend along an arc to bend the cable along a corresponding arc. A bend in the optical fibers of the cable causes attenuation of an optical signal being transmitted along the fibers. Such signal attenuation or weakening is referred to as being caused by optical bend losses. Care is required to prevent a severe bend in any optical fiber in the cable, such a bend being described as severe if such a bend exceeds a minimum bend radius of curvature that would cause undesired attenuation of an optical signal transmitted along the fiber. A severe bend is avoided in the known connector by extending a front of the cable straight from the connector, and passing the cable along a straight front portion of the strain relief before allowing the cable to bend in an arc that begins in a rearward portion of the strain relief.

Instead of extending the cable straight from the connector, it is sometimes desired to point the cable in a specified angular direction from where the cable projects from the housing halves. Heretofore, the strain relief has been unable to point the cable in an angular direction without causing a severe bend in each corresponding optical fiber of the cable.

SUMMARY OF THE INVENTION

A feature of the invention resides in a fiber optic connector for an optical fiber cable, and a fixture for holding a strain relief for the cable that points the strain relief and the cable angularly from the connector.

Another feature of the invention resides in a fiber optic connector for an optical fiber cable, and a fixture for mounting a strain relief in various angular positions relative to the connector.

A further feature of the invention resides in a fiber optic connector for an optical fiber cable, and an angularly extending fixture for angularly pointing the cable relative to the housing, and an optical fiber of the cable extending within the fixture, and being free to assume a stress relieving shape within the fixture to avoid a severe bend in the fiber.

A further feature of the invention resides in a fiber optic connector for an optical fiber cable, comprising; a strain relief encircling an optical fiber cable, at least one optical fiber projecting from the strain relief, a housing enclosing the fiber, and a fixture attached to the strain relief, the fixture interlocking to the housing at a stationary position angularly pointing the strain relief and the cable relative to the housing, and the fiber extending within the fixture, and being free to assume a stress relieving shape within the fixture to avoid a severe bend in the fiber.

The invention will now be described by way of example with reference to the accompanying drawings, in which;

DESCRIPTION OF THE DRAWINGS

With reference to FIG. 1, a fiber optic connector 1 for an optical fiber cable 2, comprises; a strain relief 3 encircling the cable 2, a housing 4, and a fixture 5 attached to the strain relief 3, the fixture 5 interlocking with the housing 4 at a stationary position angularly pointing the strain relief 3 and the cable 2 relative to the housing 4. Further details of the strain relief 3 and of the housing 4 are disclosed in EP Application 90200113.0.

With reference to FIG. 2, the cable 2 includes an outer jacket 6 directly received in a tubular, flexible portion of the strain relief 3. A radially projecting, external flange 7 is near a front end 8 of the strain relief 3. The front end 8 of the strain relief 3 is attached to a front end 9 of the jacket 6 of the cable 2. The cable 2 includes at least one corresponding optical fiber 10 projecting outward from the front end 9 of the jacket 6 of the cable 2. In the embodiment shown in FIG. 2, two corresponding optical fibers 10 are disclosed. Each corresponding optical fiber 10 is covered by a known flexible buffer. Herein, reference to an optical fiber 10 applies to a buffer covered optical fiber 10, as well as to a bare optical fiber 10, not shown.

With reference to FIGS. 2 and 3, a holder 11 comprising a ferrule surrounds each corresponding optical fiber 10 of the cable 2. The corresponding optical fiber 10 is polished on its end with an optical face 12 that is flush with a front end of the holder 11. A coil spring 13 encircles a corresponding holder 11, and is compressible between a flange 14 on the corresponding holder 11 and a reciprocating washer 15 slidably received over a corresponding holder 11 to the rear of the spring 13.

With reference to FIG. 2, the housing 4 comprises two mating housing halves 16, 17 that interlock to each other. Each housing half 16 or 17 is of unitary construction, for example, of molded plastic. The housing 4 has a front, mating end 18, a rear end 19 and two sides 20, 21 divided by the housing halves 16, 17. On each side 20, 21 of each housing half 16, 17 is a slotted hasp 22 that extends toward the other housing half 16, 17. On each side 20, 21 of each housing half 16, 17, is a projecting, wedge shaped lug 23 with a locking surface 24. When the housing halves 16, 17 mate, by being moved toward and against each other, they interlock to each other by each corresponding lug 23 entering a corresponding slotted hasp 22 and locking with the slotted hasp 22.

With reference to FIG. 2, each housing half 16, 17 has a corresponding interior recess 25 corresponding to each holder 11 for a corresponding optical fiber 10. Each corresponding holder 11 is surrounded partially by the recess 25 of each housing half 16, 17, and aligns the optical face 12 of the corresponding fiber 10 at a mating end 18 of the housing 4. The housing halves 16, 17 divide the mating end 18. The flange 14 of the corresponding holder 11 and the washer 15 of the holder 11 are received between a front wall 26 and a rear wall 27 of each housing half 16, 17. When pressure is applied to a front end of the holder 11, the holder 11 will move rearward, and the coil spring 13 will be compressed between the flange 14 and the washer 15. When pressure is released, the coil spring 13 will expand to move the holder 11 forward.

Figure 1:
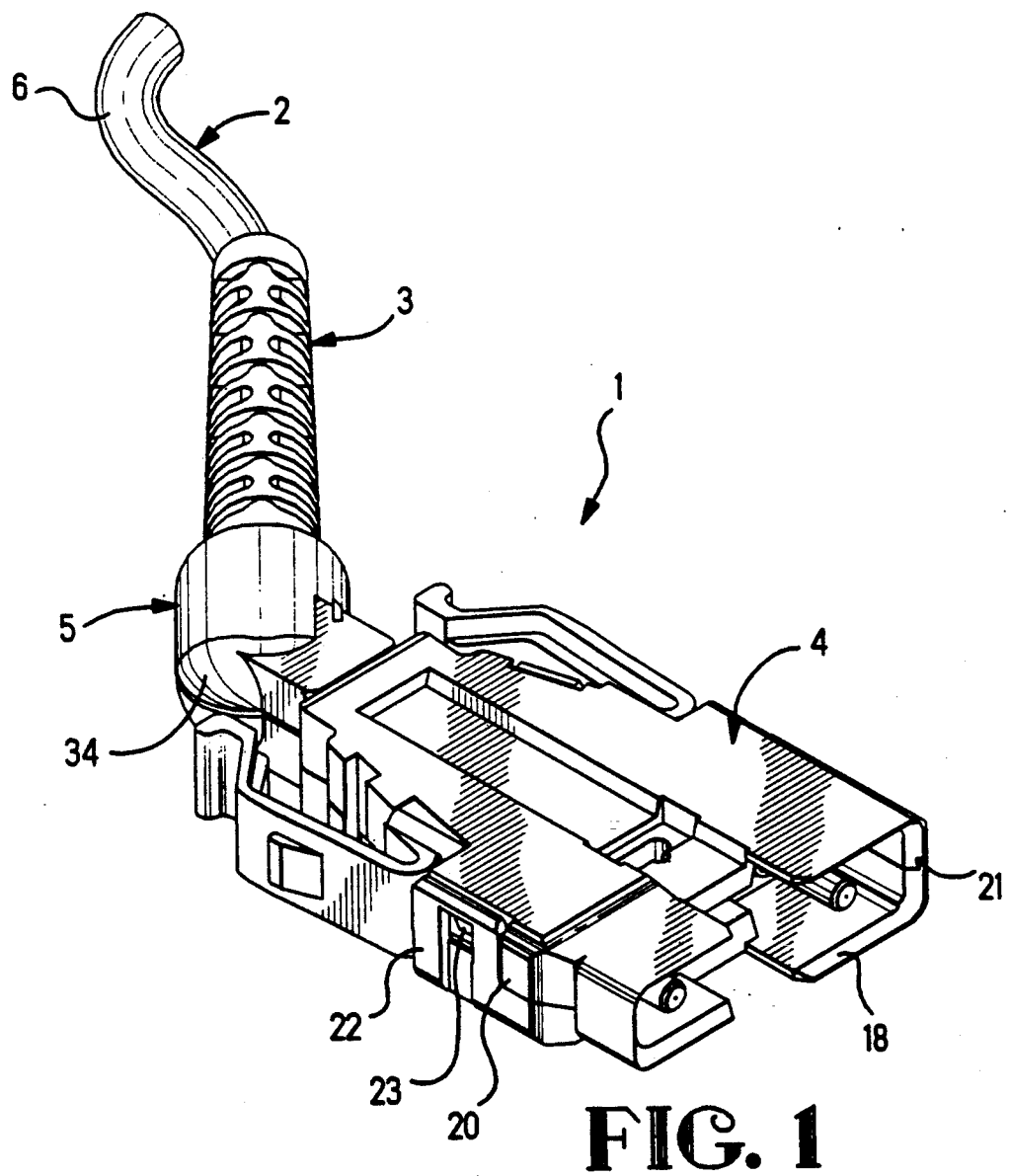
FIG. 1 is a fragmentary perspective view of a fiber optic connector for an optical fiber cable.

Each housing half 16, 17 has a hollow interior between the sides 20, 21. When the housing halves 16, 17 interlock with each other, they form the housing 4 that is hollow and loosely surrounds each corresponding optical fiber 10 projecting from the jacket 6 and the strain relief 3 to the holder 11.

Figure 2:
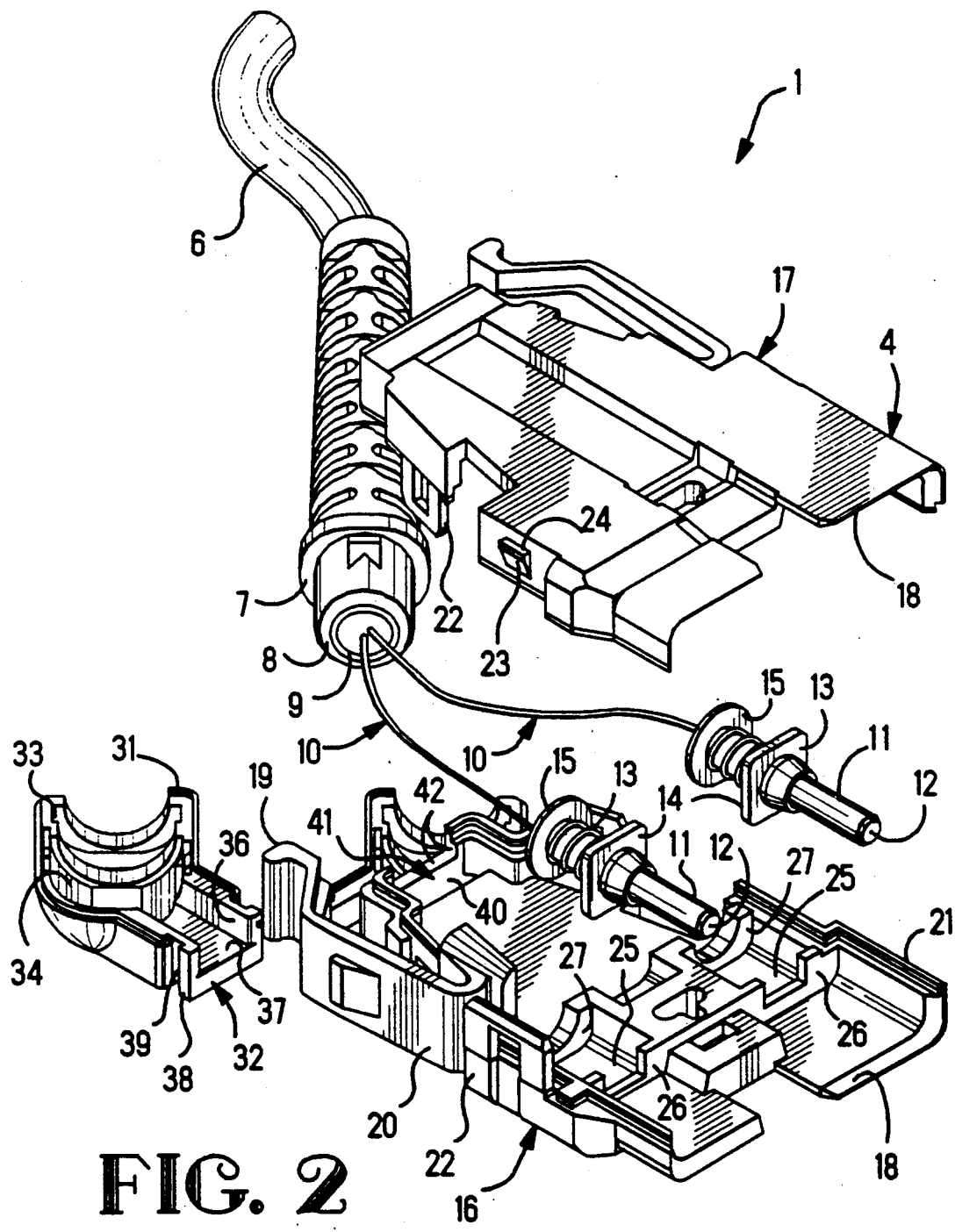
FIG. 2 is a fragmentary perspective view with parts separated from one another, and illustrating, parts of the connector and parts of a fixture and a strain relief.
Figure 5:
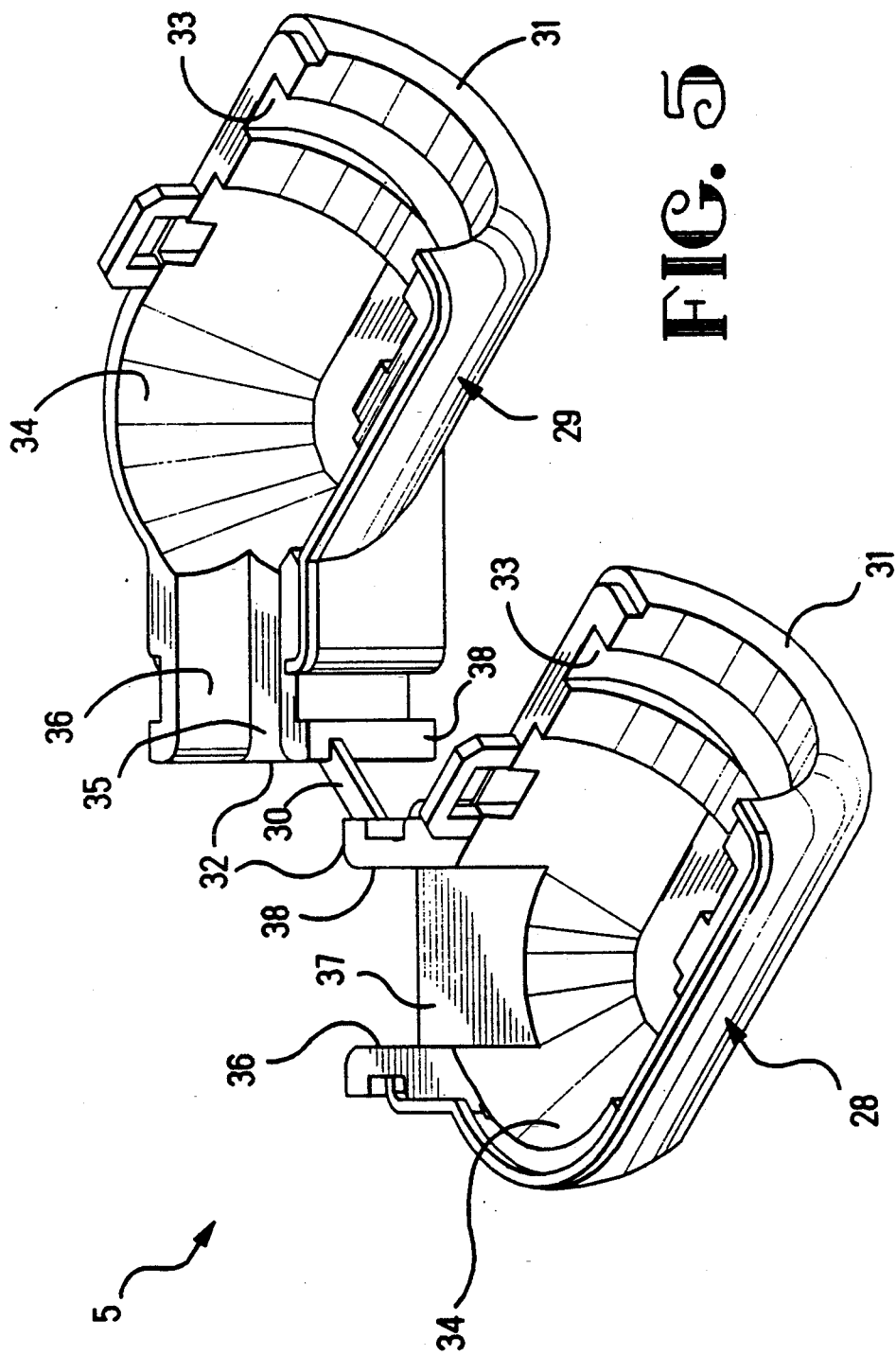
FIG. 5 is a perspective view of two fixture halves.

A feature of the invention resides in the fixture 5 for holding the strain relief 3. The fixture 5 comprises two mating fixture halves 28, 29, FIGS. 2 and 5, that divide the fixture 5 into two parts, and that interlock with each other to form the fixture 5. The fixture halves 28, 29 are joined together by a deformable web 30, FIG. 5, that bends to allow the fixture halves 28, 29 to mate to each other. Each fixture half 28, 29 angularly extends from a rear end 31 of the fixture 5 to a front end 32. A circumferential groove 33 of the fixture 5 is near the rear end 30 fits over the flange 14 of the strain relief 3. The fixture halves 28, 29 divide the rear end 30 and the groove 33. When the fixture halves 28, 29 are interlocked with each other to form the fixture 5, the flange 14 of the strain relief 3 is secured in the groove 33. The flange 14 is oblong, and the groove 33 matches the shape of the flange 14, to interlock with the strain relief 3 and to resist rotation of the strain relief 3 relative to the fixture 5.

The fixture 5 formed by the interlocked fixture halves 28, 29 surrounds a front end of, and interlocks with, the strain relief 3. The fixture 5 covers and loosely surrounds the corresponding optical fiber 10 extending from the cable 2 and from the strain relief 3. The housing 4 formed by the interlocked housing halves 16, 17 surrounds the corresponding optical fiber 10 projecting from the fixture 5 and extending to the corresponding holder 11.

Because the fixture 5 extends angularly along a bend or elbow, each corresponding fiber 10 is required to bend in an arc along the interior of the fixture 5. To allow the corresponding fiber 10 to bend in an arc, the interior space of the fixture 5 loosely surrounds the corresponding fiber 10. The interior space surrounding the corresponding fiber 10 is many times larger than the external diameter of the fiber 10. The fiber 10 does not necessarily extend concentrically along the elbow of the fixture 5. Instead, the fiber 10 extending within the fixture 5, is free to assume a shape within the fixture 5 to avoid a severe bend in the fiber 10. For example, to relieve bending stresses in the fiber 10, and to avoid a sever bend in the fiber 10, the fiber 10 assumes a smoothly curved arc that is relatively straighter than the minimum bend radius. The arc of the fiber 10 extends in and along the elbow of the fixture 5. The elbow of the fixture 5 has a more acute curvature than the arc of the fiber 10. To avoid having the fiber 10 bent to a severe arc by the elbow of the fixture 5, the interior space of the fixture 5, particularly at the elbow, surrounding the fiber 10 is many times larger than the diameter of the fiber 10. The fiber 10 and its arc shape are not constrained to a severe arc by the elbow. Instead, the fiber 10 is free to extend in an arc that does not match the arc of the elbow. The fiber 10 may extend along the fixture 5 with a different arc than that of the elbow of the fixture 5. The fixture 5 has an outwardly bulged hollow portion 34 adjacent to the front end 8 of the strain relief 3. The arc of the fiber 10 may have an arc, so different in curvature than that of the elbow, to such an extent that the fiber 10 is caused to traverse in and along the bulged hollow portion 34. The fixture halves 28, 29 divide the bulged hollow portion 34 into two parts.

Figure 3:
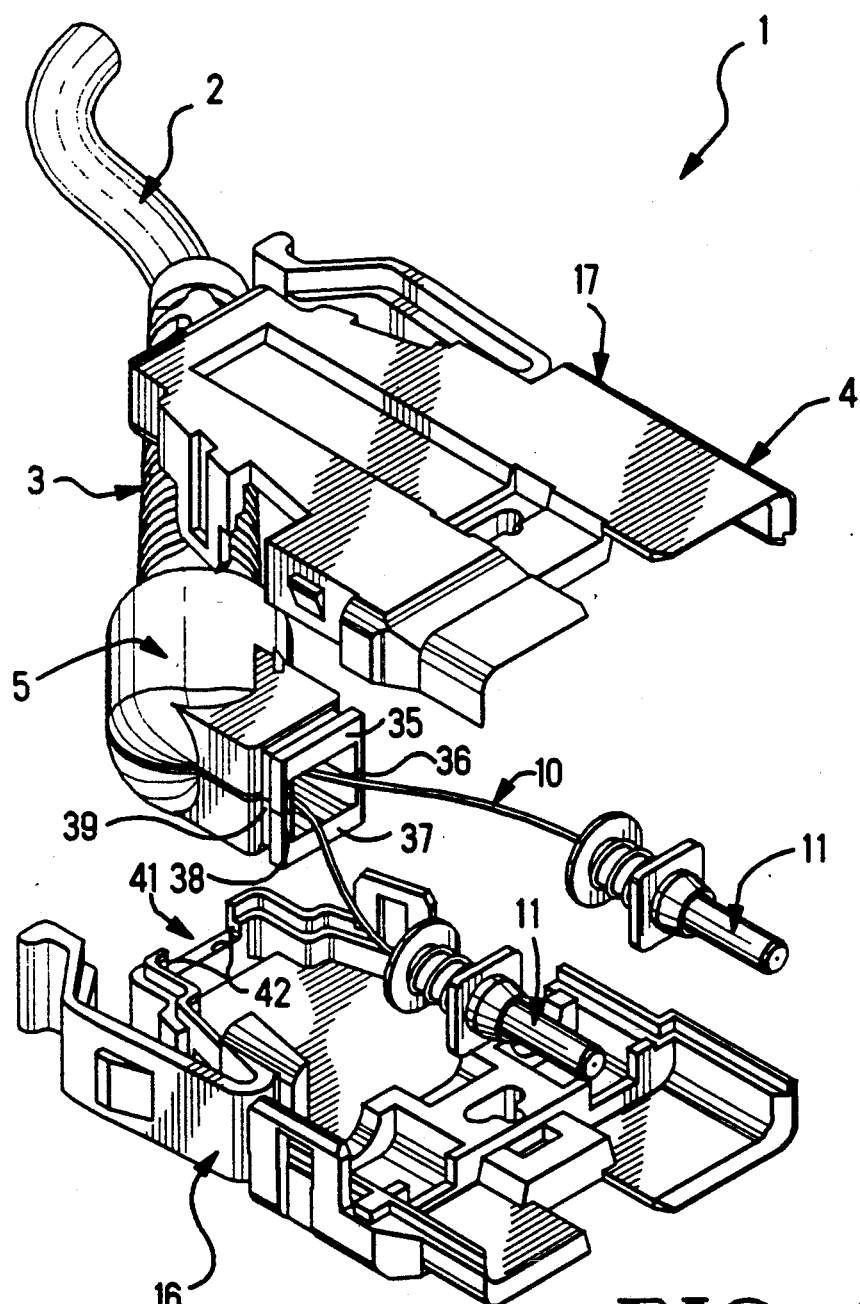
FIG. 3 is a view similar to FIG. 2 illustrating a fixture interlocked with a strain relief.
Figure 4:
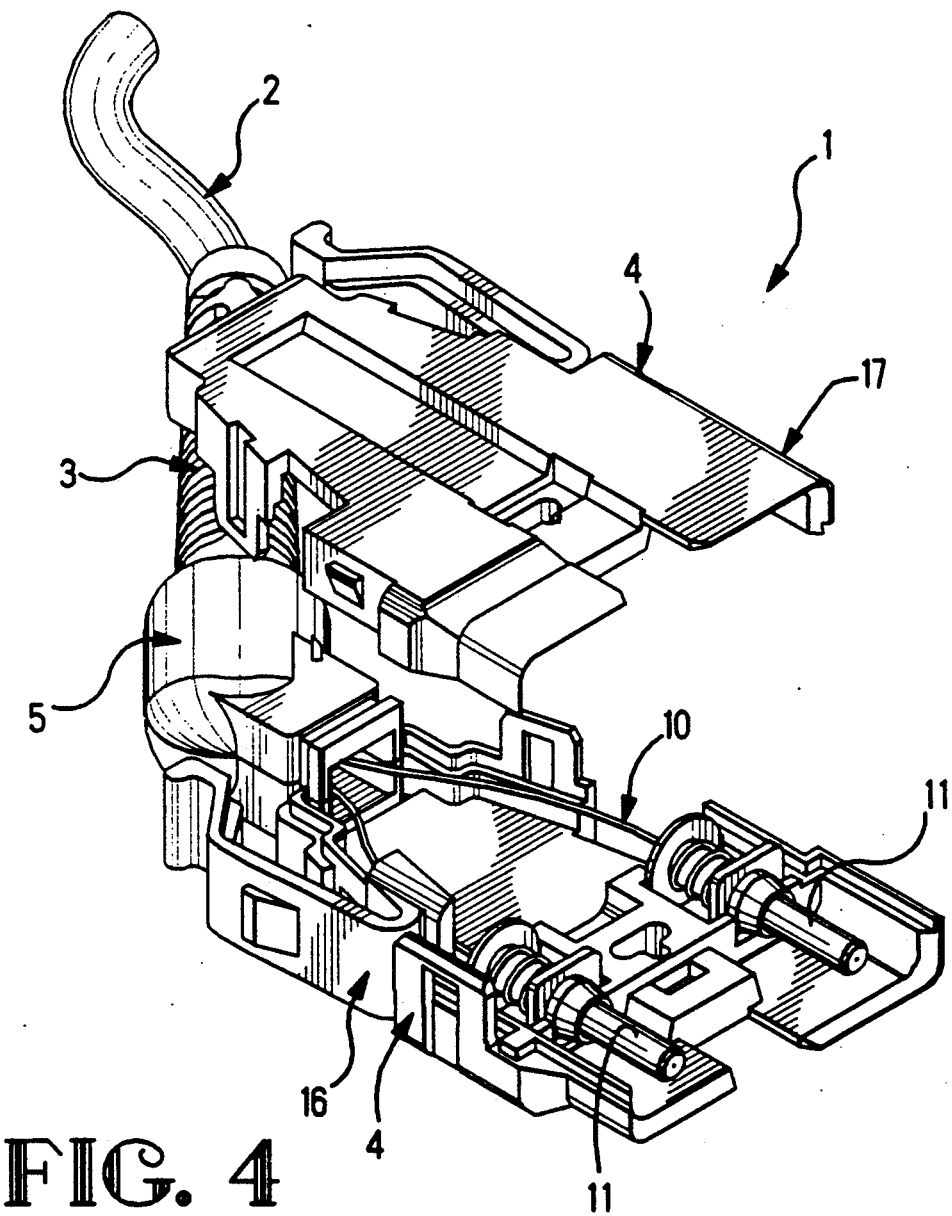
FIG. 4 is a view similar to FIG. 3 illustrating a fixture interlocked with a housing half.

A further feature of the invention resides in the fixture 5 being adapted for holding the strain relief 3 in an angular position relative to a longitudinal axis of the connector 1. The front end 32 of the fixture 5 is circumscribed by intersecting multiple sides 35, 36, 37, 38, FIG. 3. An exterior groove 39 is recessed in the sides 34, 35, 36, 37 and continuously circumscribes the exterior of the fixture 5. The fixture halves 28, 29 divide the front end 32 of the fixture 5 into two parts.

A rear wall 40 of the housing 4 interlocks with the fixture 5. The rear wall 37 has an opening 41 that receives the front end 32 of the fixture 5. The housing halves 16, 17 divide the rear wall 40 and the opening 41 into two parts. The opening 40 has multiple intersecting side edges 42 that interlock with the groove 36 in the sides 35, 36, 37, 38 of the fixture 5 and prevent relative rotation of the fixture 5 and the housing 4. With relative rotation prevented, the fixture 5 angularly extends from the housing 4, and points the strain relief 3 at an angle with respect to the housing 4. The four multiple edges 41 of the opening 40 symmetrically surround a central axis of the opening 40. The four multiple sides 35, 36, 37, 38 of the fixture 5 symmetrically surround a central axis of the front end 32. The fixture 5 fits within the opening 41 in any one of four symmetrical positions of the fixture 5. Each position of the fixture 5 points the fixture 5 in a different angular direction. The fixture 5 in each of its symmetrical positions interlocks with the opening 41 of the housing 4 to prevent relative rotation therebetween. The angular direction of the fixture 5 in each of its positions points the strain relief 3 angularly in a different direction with respect to the housing 4. Thereby, the fixture 5 adapts a strain relief 3 for an optical fiber cable 2 to extend from a fiber optic connector 1 in any one of a number of directions without causing a severe bend in a corresponding optical fiber 10 of the cable 2.

We claim:

1. A fiber optic connector for an optical fiber cable, comprising: a strain relief encircling an optical fiber cable, at least one optical fiber projecting from the strain relief, a housing enclosing the fiber, and a fixture at a front end of the strain relief interlocking with the housing at a stationary position angularly pointing the strain relief and the cable relative to the housing, and the fiber extending within the fixture, and being free to assume a shape within the fixture to avoid a severe bend in the fiber.

2. A fiber optic connector as recited in claim 1 wherein, the fixture extends angularly in between the housing and the strain relief.

3. A fiber optic connector as recited in claim 1 wherein, the fixture is hollow and loosely surrounds the fiber.

4. A fiber optic connector as recited in claim 1 wherein, the fixture includes mating halves that close onto the strain relief.

5. A fiber optic connector as recited in claim 1 wherein, the fixture has multiple sides symmetrical about at least one imaginary plane received by a mating passage of the housing.

6. A fiber optic connector as recited in claim 1, and further comprising: a holder mounted in the housing, and an optical face of the fiber being aligned by the holder at a mating end of the housing.

7. A fiber optic connector as recited in claim 1 wherein, the housing includes two mating housing halves interlocking to each other and closed over the fixture.

8. A fiber optic connector as recited in claim 1 wherein, the fixture includes an outwardly bulged portion between the strain relief and the housing.

9. A fiber optic connector as recited in claim 1 wherein, a front end of the fixture interlocks with the housing in one of multiple positions, each of the positions pointing the fixture angularly in a different direction.

10. A fiber optic connector as recited in claim 1 wherein, the front end of the fixture comprises multiple intersecting sides symmetrically arranged about an axis of the front end.

11. A fiber optic connector as recited in claim 1 wherein, the strain relief is oblong in part, and the fixture is shaped to interlock with the oblong part of the strain relief.

12. A fiber optic connector as recited in claim 1 wherein, the fixture includes an outwardly bulged portion within which the optical fiber extends in an arc.

13. A fiber optic connector as recited in claim 1 wherein, the fixture interlocks with the housing in one of a number of multiple positions, and in each of the multiple positions the fixture extends angularly from the housing in a different direction.

14. A fiber optic connector comprising: interlocking housing halves enclosing a corresponding optical fiber, a holder for the fiber aligning the fiber with respect to a housing formed by the interlocking housing halves, a strain relief and a hollow fixture extending angularly with an elbow and interlocked with the strain relief, and the strain relief surrounding a jacket of an optical fiber cable from which the corresponding optical fiber projects and extends in an arc along the fixture.

15. A fiber optic connector as recited in claim 14 wherein, the strain relief has an oblong flange, and the fixture receives the flange and interlocks the strain relief from rotation relative to the fixture.

16. A fiber optic connector as recited in claim 14 wherein, the fixture comprises mating fixture halves connected by a deformable web.

17. A fixture for interlocking with a strain relief for an optical fiber cable, and for interlocking with a housing of a fiber optic connector, the fixture comprising: mating fixture halves interlocked to each other and surrounding a front end of a strain relief for an optical fiber cable, a front end of the fixture interlocking with the housing, the fixture extending angularly from the strain relief to the housing, and the fixture being hollow and loosely surrounding an optical fiber extending in an arc along the fixture.

18. A fixture as recited in claim 17 wherein, the fixture comprises mating fixture halves connected by a deformable web.

19. A fixture as recited in claim 17 wherein, the fixture includes an outwardly bulged portion for loosely surrounding an optical fiber extending in an arc.

20. A fixture as recited in claim 17 wherein, the fixture extends angularly from the strain relief and the housing.

* * * * *